United States Patent
Ishibashi et al.

(10) Patent No.: US 11,976,719 B2
(45) Date of Patent: May 7, 2024

(54) TRANSMISSION AND CONTROL METHOD FOR TRANSMISSION

(71) Applicants: JATCO Ltd, Fuji (JP); NISSAN MOTOR CO., LTD., Yokohama (JP)

(72) Inventors: Takeaki Ishibashi, Isehara (JP); Tomohiro Inoue, Ebina (JP); Sho Kowatari, Novi, MI (US)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 75 days.

(21) Appl. No.: 17/782,778

(22) PCT Filed: Nov. 20, 2020

(86) PCT No.: PCT/JP2020/043361
§ 371 (c)(1),
(2) Date: Jun. 6, 2022

(87) PCT Pub. No.: WO2021/111899
PCT Pub. Date: Jun. 10, 2021

(65) Prior Publication Data
US 2022/0412449 A1 Dec. 29, 2022

(30) Foreign Application Priority Data
Dec. 6, 2019 (JP) .................................. 2019-221652

(51) Int. Cl.
*F16H 57/04* (2010.01)
*F16H 41/30* (2006.01)
(Continued)

(52) U.S. Cl.
CPC ....... *F16H 57/0435* (2013.01); *F16H 61/142* (2013.01); *F16H 61/143* (2013.01); *F16H 41/30* (2013.01); *F16H 45/02* (2013.01)

(58) Field of Classification Search
CPC .. F16H 41/30; F16H 45/00–2045/0294; F16H 61/1472–2061/147
See application file for complete search history.

(56) References Cited

U.S. PATENT DOCUMENTS 6,045,480 A * 4/2000 Sakai .................. F16H 15/38
192/3.3

FOREIGN PATENT DOCUMENTS

| JP | S61-27340 A | | 2/1986 |
| JP | 2001200928 A | * | 7/2001 |
| JP | 2014-114910 A | | 6/2014 |

* cited by examiner

*Primary Examiner* — Ernesto A Suarez
*Assistant Examiner* — James J Taylor, II
(74) *Attorney, Agent, or Firm* — Foley & Lardner LLP

(57) ABSTRACT

A transmission, includes a transmission mechanism including a torque converter having a lock-up clutch; an oil pump configured to discharge an oil to be supplied to the transmission mechanism; a lock-up oil pressure control valve configured to adjust a pressure of the oil discharged from the oil pump and supply the oil to the lock-up clutch; a lubricating oil pressure control valve configured to adjust the pressure of the oil discharged from the oil pump and supply the oil to a portion to be lubricated of the transmission mechanism; and a controller configured to control the lock-up oil pressure control valve. The controller controls the lock-up oil pressure control valve so that a precharge time when a lubricating oil pressure which is an oil pressure supplied from the lubricating oil pressure control valve is a first lubricating oil pressure becomes shorter than another precharge time when the lubricating oil pressure is a second lubricating oil pressure which is lower than the first lubricating oil pressure when performing a precharge of supplying the oil to the lock-up clutch.

6 Claims, 7 Drawing Sheets

(51) Int. Cl.
*F16H 45/02* (2006.01)
*F16H 61/14* (2006.01)

TRANSMISSION AND CONTROL METHOD FOR TRANSMISSION

TECHNICAL FIELD

The present invention relates to a lock-up clutch of a torque converter in a transmission.

BACKGROUND ART

JP2014-114910A discloses a transmission including an oil pressure control device having a hydraulic circuit that connects: a lubricating oil passage for supplying lubricating oil to a portion of the transmission where lubrication is required, and an oil passage that supplies oil to a lock-up clutch.

SUMMARY OF INVENTION

In such a transmission, it is conceivable to control the oil pressure of the lubricating oil passage so that the oil reaches the end of the portion requiring lubrication. However, if the oil pressure of the lubricating oil passage is controlled by the transmission with the hydraulic circuit configuration in which the lubricating oil passage and the oil passage that supplies oil to the lock-up clutch are connected, changes of the oil pressure due to this control may also affect the oil pressure of the oil passage that supplies oil to a lock-up piston, and may affect the control of the lock-up clutch.

The present invention has been made in view of such a technical problem, and the purpose of the present invention is to make it possible to accurately control the lock-up clutch in the transmission having the hydraulic circuit for controlling the lubricating oil pressure.

According to an aspect of the present invention, a transmission, including: a transmission mechanism including a torque converter having a lock-up clutch; an oil pump configured to discharge an oil to be supplied to the transmission mechanism; a lock-up oil pressure control valve configured to adjust a pressure of the oil discharged from the oil pump and supply the oil to the lock-up clutch; a lubricating oil pressure control valve configured to adjust the pressure of the oil discharged from the oil pump and supply the oil to a portion to be lubricated of the transmission mechanism; and a controller configured to control the lock-up oil pressure control valve, is provided. The controller controls the lock-up oil pressure control valve so that a precharge time when a lubricating oil pressure which is an oil pressure supplied from the lubricating oil pressure control valve is a first lubricating oil pressure becomes shorter than another precharge time when the lubricating oil pressure is a second lubricating oil pressure which is lower than the first lubricating oil pressure when performing a precharge of supplying the oil to the lock-up clutch.

According to the above aspect, when the lubricating oil pressure of the transmission mechanism is the first lubricating oil pressure, which is higher than the second lubricating oil pressure, the precharge time is made shorter than the precharge time in the case when the lubricating oil pressure of the transmission mechanism is the second lubricating oil pressure. That is, precharge is performed by setting the precharge time based on the lubricating oil pressure. Thereby, precharge is performed based on the oil filling state of the hydraulic circuit leading to the lock-up clutch that changes due to the lubricating oil pressure, and thus, it is possible to prevent the lock-up clutch from being unintentionally engaged. That is, the lock-up clutch can be controlled accurately.

DESCRIPTION OF EMBODIMENTS

Embodiments of the present invention will be described below with reference to the accompanying drawings.

Figure 1:
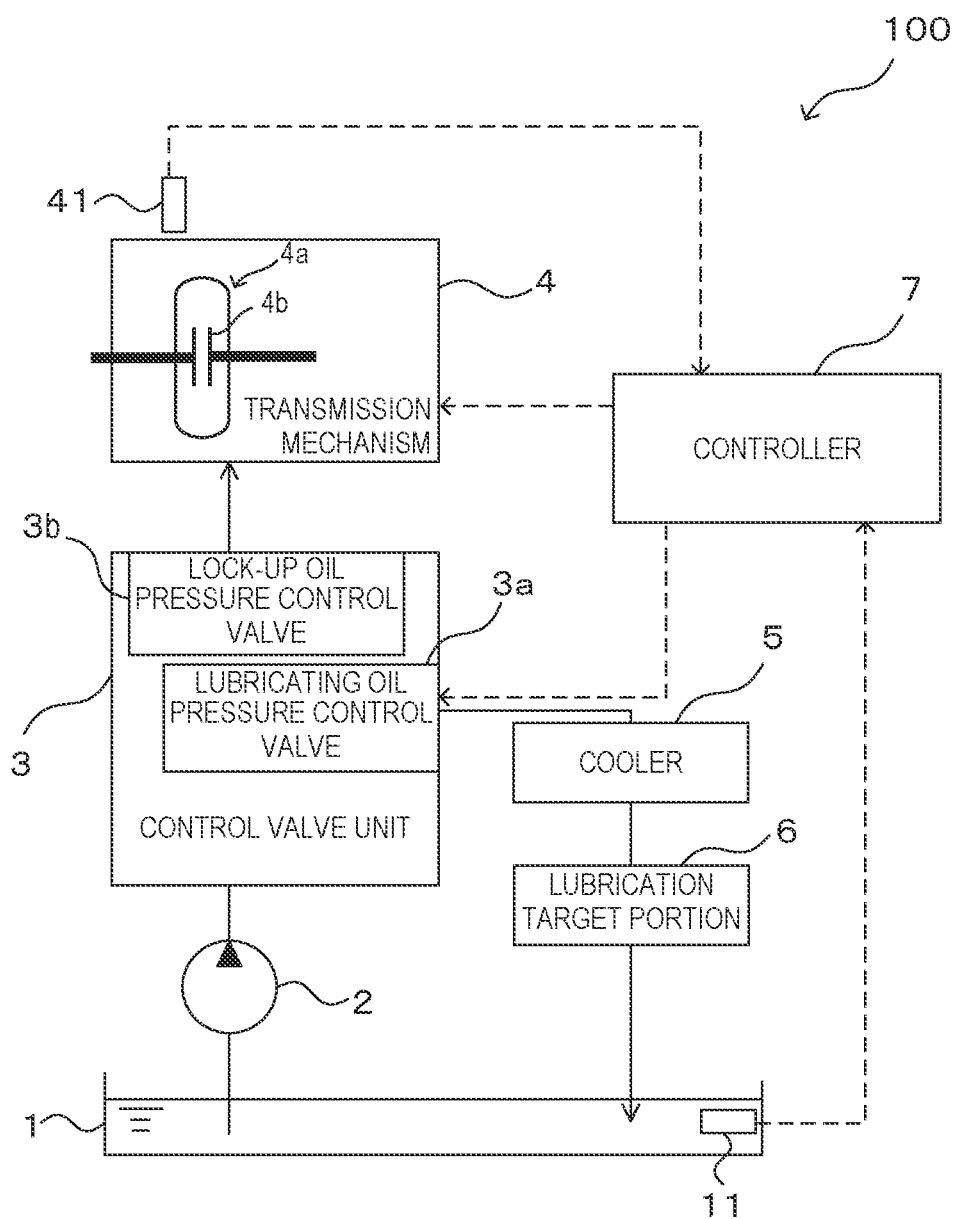
FIG. 1 is a schematic configuration diagram of a hydraulic circuit of a transmission according to an embodiment of the present invention.

FIG. 1 is a diagram showing a configuration of a hydraulic circuit of a transmission 100 according to an embodiment of the present invention. The transmission 100 includes an oil pan 1, an oil pump 2, a control valve unit 3 having a lubricating oil pressure control valve 3a and a lock-up oil pressure control valve 3b, a transmission mechanism 4 including a torque converter 4a having a lock-up clutch 4b, a cooler 5, a lubrication target portion 6, and a controller 7.

The oil pan 1 stores a predetermined amount of oil for the supply to the transmission mechanism 4, the lubrication target portion 6, etc. In addition, the oil supplied to the transmission 100 is discharged from the transmission mechanism 4, the lubrication target portion 6, etc. to be described later, and is recovered in the oil pan 1. The oil pan 1 is provided with an oil pan oil temperature sensor 11 that detects the temperature of the oil stored in the oil pan 1 (oil pan oil temperature To).

The oil pump 2 pumps up the oil stored in the oil pan 1, generates an oil pressure to discharge the oil, and supplies the oil to the control valve unit 3. The oil pump 2 may be a mechanical oil pump driven by power input from a power source, or may be an electric oil pump driven by a supply of electric power.

The control valve unit 3 adjusts the pressure of the oil supplied from the oil pump 2, and supplies the oil to the transmission mechanism 4. The control valve unit 3 includes the lubricating oil pressure control valve 3a and the lock-up oil pressure control valve 3b. The lubricating oil pressure control valve 3a and the lock-up oil pressure control valve 3b are configured of a valve body and a solenoid that controls the valve body, respectively. The control valve unit 3 adjusts the pressure of the oil supplied from the oil pump 2 by the lubricating oil pressure control valve 3a, and supplies the oil to the lubrication target portion 6 to be described later. The control valve unit 3 adjusts the pressure of the oil supplied from the oil pump 2 by the lock-up oil pressure control valve 3b, and supplies the oil to the lock-up clutch 4b of the torque converter 4a.

The transmission mechanism 4 includes a torque converter 4a and an unillustrated gear position mechanism.

When rotary power is input from an engine (not illustrated) which acts as the power source, the torque converter 4a amplifies the torque according to the rotation speed difference between the input side and the output side, and transmits the rotary power to the gear position mechanism. The torque converter 4a can improve the transmission efficiency of rotary power output from the engine by engaging (locking up) the lock-up clutch 4b. Inside the torque converter 4a, an internal pressure sensor that detects the internal pressure of the torque converter 4a is provided (not illustrated). Further, the internal pressure of the torque converter 4a may be estimated by the controller 7 based on the oil pressure of the hydraulic circuit, etc.

The lock-up clutch 4b is engaged when the pressure difference between the internal pressure of the torque converter 4a and the piston pressure of the lock-up clutch 4b becomes a predetermined value. The engagement of the lock-up clutch 4b is controlled through the control of the piston pressure of the lock-up clutch 4b by the controller 7 to be described later. The turbine of the torque converter 4a is provided with a turbine rotation speed sensor 41 that detects a turbine rotation speed Nt.

The gear position mechanism changes an engagement state of frictional engagement elements according to the oil pressure of the oil supplied from the control valve unit 3 to achieve a predetermined gear position. The gear position mechanism shifts the rotary power transmitted from the torque converter 4a at a transmission ratio corresponding to the gear position.

The transmission mechanism 4 is provided with an ATF oil temperature sensor (not illustrated) that detects the oil temperature (hereinafter referred to as ATF oil temperature) in the transmission mechanism 4.

The cooler 5 is provided between the lubricating oil pressure control valve 3a and the lubrication target portion 6 in the hydraulic circuit. The cooler 5 cools the oil whose pressure is adjusted by the lubricating oil pressure control valve 3a and supplies the oil to the lubrication target portion 6. In this embodiment, the cooler 5 is an air-cooled heat exchanger. When the oil supplied to the cooler 5 passes through a plurality of thin tubes constituting the heat exchanger, the oil is cooled by the outside air that comes into contact with the outer walls of the thin tubes.

The lubrication target portion 6 is a comprehensive representation of the portions of the transmission mechanism 4 that are lubricated by oil, such as the rotating unit, sliding unit, and bearing unit. In FIG. 1, the lubrication target portion 6 is drawn outside the transmission mechanism 4 for convenience, but the lubrication target portion 6 is a part of the transmission mechanism 4. The lubrication target portion 6 is lubricated by the oil supplied from the cooler 5. Further, the oil which has lubricated the lubrication target portion 6 is then discharged to the oil pan 1.

The controller 7 is a control device that controls the transmission 100, and is configured of one or a plurality of microcomputers including a central processing unit (CPU), a storage device (RAM and ROM) and an input/output interface (I/O interface). Detection signals are input to the controller 7 from a vehicle speed sensor or an accelerator pedal opening sensor provided in the vehicle mounted with the transmission 100. The controller 7 determines the gear position that the gear position mechanism should take based on these signals. Then, the controller 7 controls the control valve unit 3 to adjust the pressure of the oil supplied to the transmission mechanism 4 in order to realize the gear position. Further, the controller 7 controls the control valve unit 3 to adjust the pressure of the oil supplied to the lock-up clutch 4b in order to engage the lock-up clutch 4b when a predetermined lock-up condition (for example, the vehicle speed is equal to or higher than a predetermined vehicle speed) is satisfied.

The detection signals of the oil pan oil temperature To and the turbine rotation speed Nt are input to the controller 7 from each of the oil pan oil temperature sensor 11 and the turbine rotation speed sensor 41. The controller 7 controls the oil pressure of the oil supplied from the lubricating oil pressure control valve 3a to the lubrication target portion 6 (hereinafter referred to as "lubricating oil pressure") to ensure the required oil pressure for supplying oil to the end of the lubrication target portion 6, that is, the lower limit of the oil pressure at which the lubrication target portion 6 does not cause poor lubrication (hereinafter referred to as "required lubricating oil pressure"), based on the oil pan oil temperature To, the turbine rotation speed Nt, and the turbine torque Tt calculated from the engine torque and the torque ratio of the torque converter.

The controller 7 stores the target value (the value of the pressure difference between the internal pressure of the torque converter 4a and the piston pressure of the lock-up clutch 4b) for controlling the engagement of the lock-up clutch 4b. The lock-up clutch 4b is engaged when the pressure difference between the internal pressure of the torque converter 4a and the piston pressure of the lock-up clutch 4b becomes the target value. Therefore, when engaging the lock-up clutch 4b, the controller 7 calculates the amount of oil to be supplied to the piston of the lock-up clutch 4b for making the pressure difference between the internal pressure of the torque converter 4a and the piston pressure of the lock-up clutch 4b to the target value based on the detection signal of the internal pressure of the torque converter 4a, which is input from the internal pressure sensor, and the target value, and controls the lock-up oil pressure control valve 3b so that the oil is supplied to the piston of the lock-up clutch 4b. Further, in the following description, the aforementioned control will be referred to as pressure difference control. When the controller 7 performs the pressure difference control and the pressure difference between the internal pressure of the torque converter 4a and the piston pressure of the lock-up clutch 4b becomes the target value, the lock-up clutch 4b is engaged.

Further, when the controller 7 controls to engage the frictional engagement elements or the lock-up clutch 4b, etc. of the transmission mechanism 4, the controller 7 performs a precharge by opening the valve and supplying oil to the frictional engagement elements or the lockup clutch 4b, etc. of the transmission mechanism 4 in advance so that the initial movement of these pistons is performed promptly. Specifically, the control valves 3a and 3b of the control valve unit 3 are controlled to supply oil to the hydraulic circuit leading to the frictional engagement elements or the lock-up clutch 4b of the transmission mechanism 4 in order to stroke the frictional engagement elements or the pistons of the lock-up clutch 4b of the transmission mechanism 4 from the release position to a position where the frictional elements contact each other (without torque transmission capacity). "Precharge" refers to supplying oil by setting the oil pressure higher than the target oil pressure (oil pressure required for engagement) in order to move the frictional engagement elements or the pistons of the lock-up clutch 4b of this transmission mechanism 4 from the release position to a position where the frictional elements contact each other (to close the gap), and after performing a precharge for a predetermined time, the oil pressure is lowered to prevent a sudden engagement. By precharging, it is possible to engage the frictional engagement elements or the lock-up clutch 4b in a shorter time than when oil is supplied to engage the frictional engagement elements or the lock-up clutch 4b of the transmission mechanism 4 from a state where precharge is not performed.

By the way, when the transmission 100 is placed in an environment where the outside air temperature is low, the oil is cooled by the cooler 5 and the viscosity of the oil increases, and the pressure loss when supplying the oil to the lubrication target portion 6 increases, and thus, the oil may fail to reach the end of the lubrication target portion 6 sufficiently, and lubrication may be insufficient at the lubrication target portion 6. Therefore, the controller 7 controls the lubricating oil pressure by considering the outside air temperature in addition to the oil pan oil temperature To, the turbine rotation speed Nt, and the turbine torque Tt.

Here, when the lubricating oil pressure is controlled in the transmission 100 with a hydraulic circuit in which the lubrication target portion 6 and the transmission mechanism 4 (the torque converter 4a, the lock-up clutch 4b) are connected, changes of the lubricating oil pressure due to this control also affect the oil pressure of the hydraulic circuit leading to the lock-up clutch 4b. If this effect causes the oil to fill the hydraulic circuit leading to the lock-up clutch 4b, the oil is supplied to the hydraulic circuit that is already filled with the oil when the lock-up clutch 4b is precharged with the oil, and thus, the lock-up clutch 4b may be engaged during the precharge. Therefore, in this embodiment, the controller 7 controls the lubricating oil pressure and meanwhile controls the precharge of the lock-up clutch 4b.

First, the control of the lubricating oil pressure executed by the controller 7 is described with reference to FIGS. 2-4.

Figure 2:
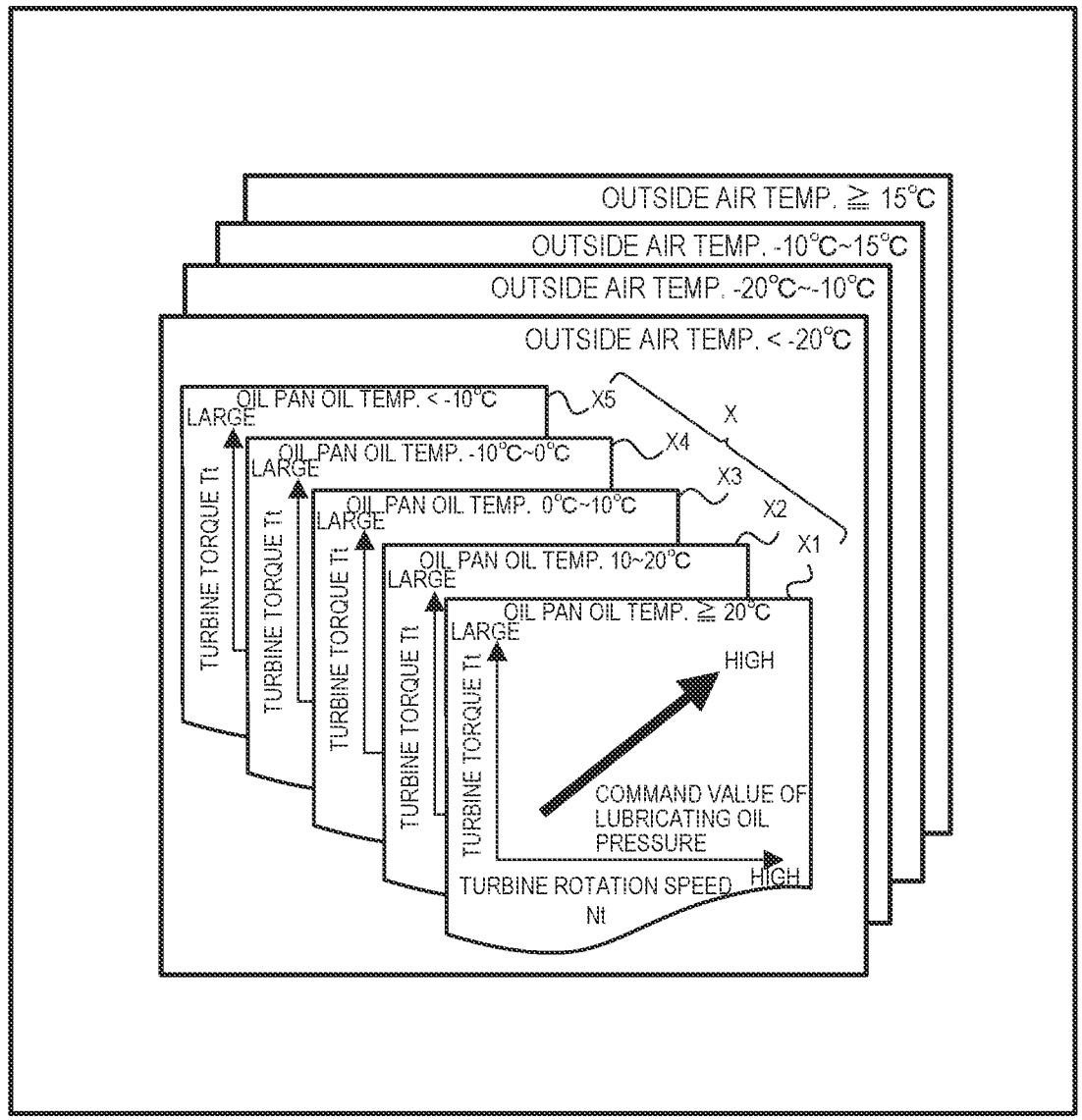
FIG. 2 is a map for setting a lubricating oil pressure.
Figure 3:
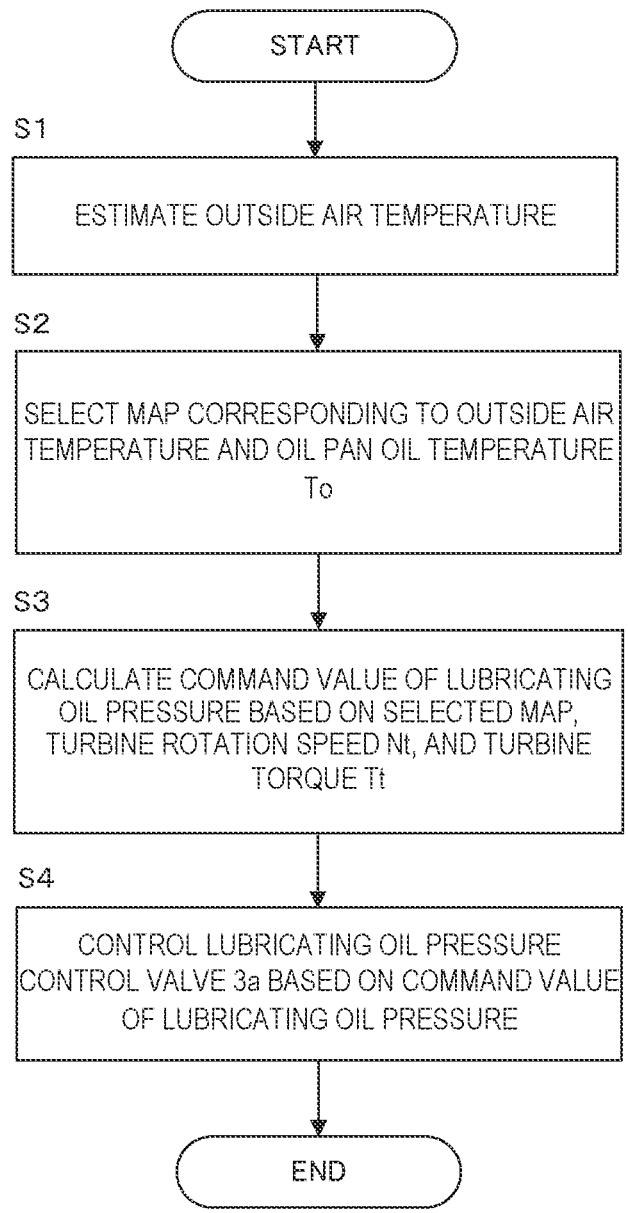
FIG. 3 is a flowchart showing the processing contents of a lubricating oil pressure control by a controller.

As shown in FIG. 2, the storage device of the controller 7 has stored a plurality of maps for calculating the command value of lubricating oil pressure (maps X1~Xn, hereinafter collectively referred to as "map X") based on the outside air temperature, oil pan oil temperature To, turbine rotation speed Nt and turbine torque Tt.

To reduce the amount of data, regarding the outside air temperature and oil pan temperature, the map X has been prepared for each predetermined outside air temperature range (lower than −20° C., equal to or higher than −20° C. and lower than −10° C., equal to or higher than −10° C. and lower than 15° C., higher than 15° C.) and for each predetermined oil pan temperature range (lower than −10° C., equal to or higher than −10° C. and lower than 0° C., equal to or higher than 0° C. and lower than 10° C., equal to or higher than 10° C. and lower than 20° C., higher than 20° C.). The controller 7 selects and refers to the map corresponding to the outside air temperature, oil pan oil temperature To, turbine rotation speed Nt and turbine torque Tt, and calculates the command value of lubricating oil pressure.

The required lubricating oil pressure tends to increase as the outside air temperature decreases or as the oil pan oil temperature To decreases. Therefore, for each map X, the required lubricating oil pressure, which corresponds to the lowest value in the corresponding outside air temperature range (the minimum expected outside air temperature in the range where there is no lower limit) as well as the lowest value in the corresponding oil pan oil temperature range (the minimum expected oil pan temperature in the range where there is no lower limit), is stored as the command value of lubricating oil pressure. This ensures that the lubricating oil pressure achieved based on the command value does not fall below the required lubricating oil pressure.

For example, in the map X1 where the outside air temperature is lower than −20° C. and the oil temperature To is equal to or higher than 20° C., the required lubricating oil pressure, which corresponds to the minimum expected outside air temperature of −40° C. and oil pan temperature of 20° C., is stored as the command value of lubricating oil pressure.

Further, since the required lubricating oil pressure tends to increase as the turbine rotation speed Nt increases or as the turbine torque Tt increases, the command value of lubricating oil pressure stored in each map X also has the same tendency.

In this way, the controller 7 sets the command value of lubricating oil pressure in consideration of the outside air temperature in addition to the turbine rotation speed Nt, the turbine torque Tt, and the oil pan oil temperature To. That is, the controller 7 sets the command value of lubricating oil pressure based on the change of oil temperature and oil viscosity in the cooler 5 due to the change of outside air temperature.

Next, the specific processing contents of the lubricating oil pressure control by the controller 7 will be described with reference to FIG. 3.

First, in Step S1, the controller 7 acquires the intake air temperature Te of the engine, which is obtained from the detection signal of the intake air temperature sensor of the engine, from the engine controller, and estimates the outside air temperature based on the intake air temperature Te of the engine. There is a correlation that the outside air temperature decreases as the intake air temperature Te of the engine decreases, and thus, the controller 7 estimates that the outside air temperature decreases as the intake air temperature Te of the engine decreases. Once the controller 7 estimates the outside air temperature, the controller 7 advances the process to Step S2.

Further, the method of obtaining the outside air temperature is not limited to this, for example, the outside air temperature may be detected by an outside air temperature sensor which detects the outside air temperature and is attached to a front bumper, a door mirror, etc. Further, the outside air temperature may be acquired from the weather information obtained via wireless communication (mobile phone line, radio, etc.).

In Step S2, from a plurality of maps X, the controller 7 selects the map corresponding to the outside air temperature estimated in Step S1 and the oil pan oil temperature To calculated based on the signal input from the oil pan oil temperature sensor 11 and advances the process to Step S3.

In Step S3, the controller 7 calculates the command value of lubricating oil pressure based on the map X selected in Step S2, the turbine rotation speed Nt calculated from the signal input from the turbine rotation speed sensor 41, and the turbine torque Tt calculated from the engine torque and the torque ratio of the torque converter. After calculating the command value of required lubricating oil pressure, the controller 7 advances the process to Step S4.

In Step S4, the controller 7 controls the lubricating oil pressure control valve 3a so that the lubricating oil pressure becomes the command value based on the command value of lubricating oil pressure calculated in Step S3. Thereby, the lubricating oil pressure is controlled to be equal to or higher than the required lubricating oil pressure.

Figure 4:
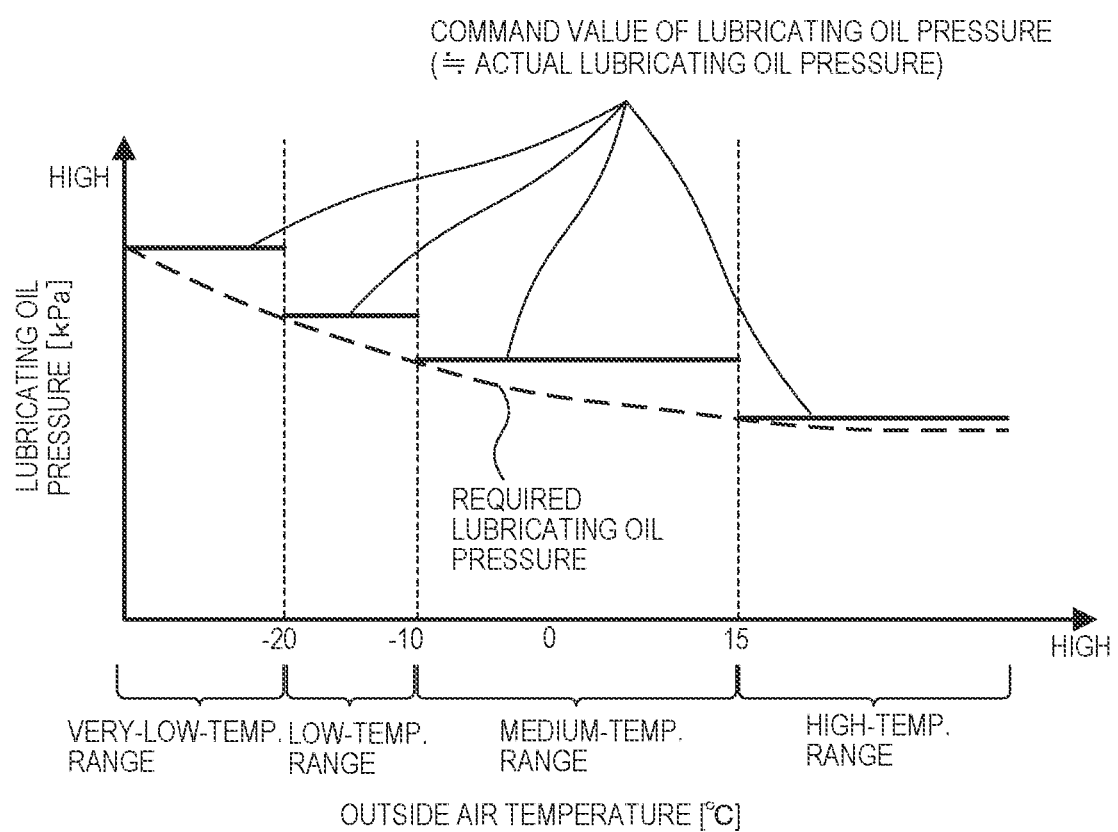
FIG. 4 is a diagram showing the changes according to the outside air temperature in the lubricating oil pressure set at a specific turbine rotation speed, a specific turbine torque, and a specific oil pan oil temperature.

FIG. 4 is a diagram showing how the lubricating oil pressure, which is set at a specific turbine rotation speed Nt, a specific turbine torque Tt, and a specific oil pan oil temperature To, changes according to the outside air temperature. The solid line shows the command value of lubricating oil pressure, and the actual lubricating oil pressure controlled based on the command value is almost equal to the command value of lubricating oil pressure. The dashed line shows the required lubricating oil pressure.

As shown in FIG. 4, the lubricating oil pressure tends to increase as the outside air temperature decreases. Since the map X is prepared for each predetermined outside air temperature range, the lubricating oil pressure changes stepwise according to the outside air temperature, but in each outside air temperature range, the required lubricating oil pressure, which corresponds to the lowest value in the corresponding outside air temperature range (the minimum expected outside air temperature in the range where there is no lower limit), is set as the command value of lubricating oil pressure, and thus, the lubricating oil pressure is always set higher than the required lubricating oil pressure.

Thereby, even in a situation where the outside air temperature is low and the viscosity of the oil is high, the oil can be supplied to the end of the lubrication target portion 6 and the lubrication target portion 6 can be appropriately lubricated.

Further, here, the lubricating oil pressure changes stepwise according to the outside air temperature due to the influence of the number of maps X prepared, but it is not necessary to change the lubricating oil pressure stepwise, and the number of maps X may be increased, or the command value of lubricating oil pressure may be set using a function, and the lubricating oil pressure may be changed smoothly according to the outside air temperature.

Figure 5:
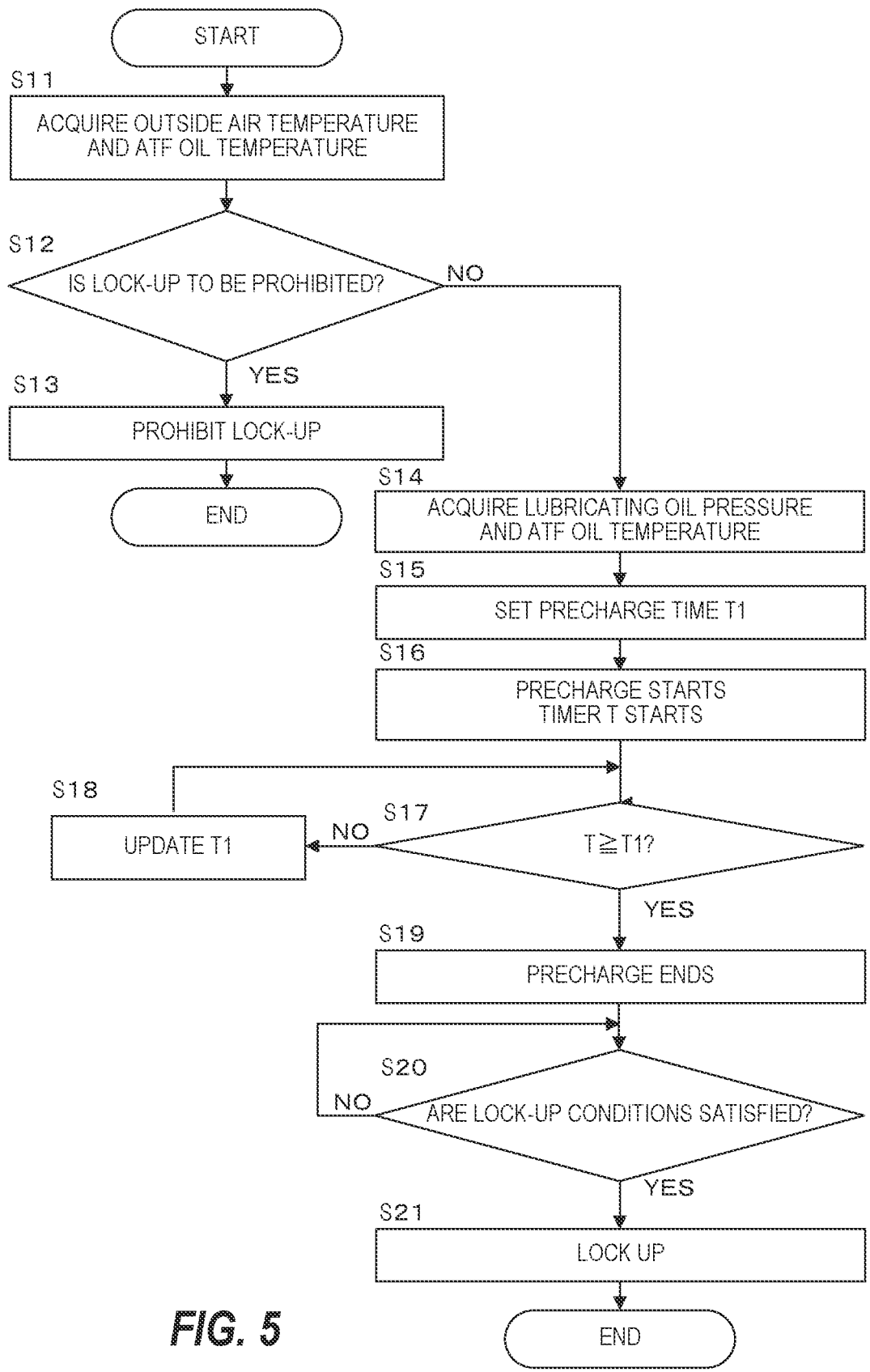
FIG. 5 is a flowchart showing the processing contents of a lock-up clutch control.

Next, the control of the lock-up clutch 4b executed by the controller 7 is described with reference to FIGS. 5-7. FIG. 5 is a flowchart showing the specific processing contents of the control of the lock-up clutch 4b executed by the controller 7. The processing of this control is roughly divided into: the stage of determining whether the lock-up clutch 4b can be engaged (Step S11~Step S13), the stage of precharge control when a lock-up is performed (Steps S14~S19), and the stage of engaging the lock-up clutch 4b (Steps S20~S21).

First, in Step S11, the controller 7 obtains the outside air temperature. As for the method of obtaining the outside air temperature, there is a method of estimating the outside air temperature based on the intake air temperature Te of the engine by acquiring the intake air temperature Te of the engine, which is obtained from the detection signal of the intake air temperature sensor of the engine, from the engine controller, as in Step S1 of FIG. 3. Further, for example, the outside air temperature may be obtained by an outside air temperature sensor which detects the outside air temperature and is attached to a front bumper, a door mirror, etc. Further, the outside air temperature may be obtained from the weather information obtained via wireless communication (mobile phone line, radio, etc.).

Meanwhile, in Step S11, the controller 7 obtains the ATF oil temperature from the signal input from the ATF oil temperature sensor. Once the controller 7 obtains the outside air temperature and the ATF oil temperature, the controller 7 advances the process to Step S12.

Figure 6:
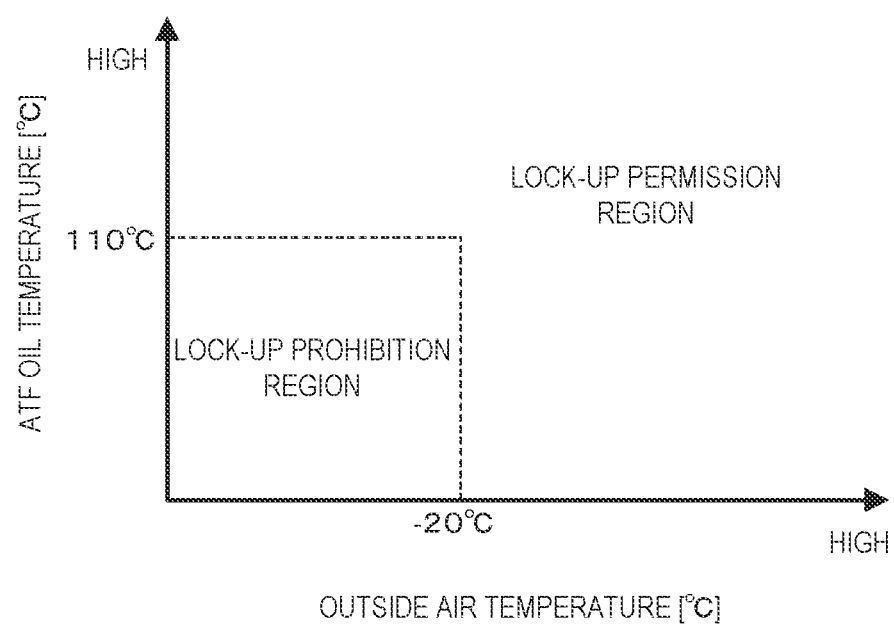
FIG. 6 is a map for determining a lock-up permission of the lock-up clutch.

In Step S12, the controller 7 determines whether the transmission 100 is ready to permit the lock-up clutch 4b to be engaged based on the outside air temperature and the ATF oil temperature obtained in Step S11 and the map shown in FIG. 6.

FIG. 6 is a map for determining a lock-up permission of the lock-up clutch 4b. The map is stored in the storage device of the controller 7.

The controller 7 applies the outside air temperature and the ATF oil temperature obtained in Step S11 to the map of FIG. 6, and when the outside air temperature is equal to or lower than a specific low temperature and the ATF oil temperature is equal to or lower than a specific high oil temperature (when corresponding to the lock-up prohibition region in FIG. 6), the controller 7 advances the process to S13 and prohibits the engagement of the lock-up clutch 4b. The specific low temperature is, for example, −20° C. The specific high oil temperature is, for example, 110° C.

When the outside air temperature is equal to or lower than the specific low temperature (−20° C. in this embodiment) and the ATF oil temperature is equal to or lower than the specific high oil temperature (110° C. in this embodiment), the reasons for prohibiting the engagement of the lock-up clutch 4b are as follows. As shown in FIG. 4, when the outside air temperature is equal to or lower than −20° C., the lubricating oil pressure is set high and is set to be equal to or higher than a specific lubricating oil pressure. Due to the configuration of the hydraulic circuit of the transmission 100, there is a correlation between the lubricating oil pressure and the internal pressure of the torque converter 4a, and thus, if the lubricating oil pressure is set high, the internal pressure of the torque converter 4a also becomes high. Under the condition that the internal pressure of this torque converter 4a is high, when it becomes necessary (for example, when the gear position is changed) to precharge the oil to a clutch other than the lock-up clutch 4b (for example, the frictional engagement elements of the transmission mechanism 4) and the oil is supplied to the clutch, the lubricating oil pressure also changes. Here, if the lubricating oil pressure set to be equal to or higher than a specific lubricating oil pressure changes, the internal pressure of the torque converter 4a will also change significantly, and thus, it becomes difficult to maintain the accuracy of the pressure difference control for engaging the lock-up clutch 4b, and it becomes difficult to control the engagement state of the lock-up clutch 4b to a desired state. Therefore, when the outside air temperature is equal to or lower than −20° C., in other words, when the lubricating oil pressure is equal to or higher than a specific lubricating oil pressure, the lock-up of the lock-up clutch 4b is prohibited in principle.

However, even if the outside air temperature is equal to or lower than −20° C. (if the lubricating oil pressure is equal to or higher than a specific lubricating oil pressure), when the ATF oil temperature exceeds 110° C., it is necessary to lower the ATF oil temperature to protect parts with low heat resistance, and thus, the release of the lock-up clutch 4b, which is the cause of the increase in the ATF oil temperature, is prohibited. That is, in this case, the controller 7 permits the engagement of the lock-up clutch 4b.

Thus, when the outside air temperature is equal to or lower than −20° C. and the ATF oil temperature is equal to or lower than 110° C. (when corresponding to the lock-up prohibition region in FIG. 6), the controller 7 advances the process to Step S13 and prohibits the engagement of the lock-up clutch 4b. Further, when the outside air temperature is higher than −20° C., or when the ATF oil temperature exceeds 110° C. even if the outside air temperature is equal to or lower than −20° C. (when corresponding to the lock-up permission region in FIG. 6), the controller 7 advances the process to Step S14.

In Step S14, the controller 7 obtains the lubricating oil pressure and the ATF oil temperature in order to perform the precharge control of the engagement controls of the lock-up clutch 4b. The method of obtaining the lubricating oil pressure may be: calculating the lubricating oil pressure based on the command value of the lubricating oil pressure calculated in Step S3 of FIG. 3; or providing an oil pressure sensor in the circuit leading to the lubrication target portion 6 to measure the lubricating oil pressure and outputting the detection signal from the oil pressure sensor to the controller 7. The ATF oil temperature is obtained from the signal input from the ATF oil temperature sensor. After obtaining the lubricating oil pressure and the ATF oil temperature, the controller 7 advances the process to Step S15.

By the way, as described above, in the transmission 100 according to this embodiment, the hydraulic circuit connects the lubrication target portion 6 and the transmission mechanism 4 (torque converter 4a, lock-up clutch 4b). Therefore, when the lubricating oil pressure of the lubrication target portion 6 is increased by performing the control of the lubricating oil pressure shown in FIG. 3, the oil is filled into the hydraulic circuit leading to the lock-up clutch 4b accordingly. In this situation, if the controller 7 performs the precharge by setting the precharge time to a uniform time without considering the oil filling state of the hydraulic circuit, the oil will be supplied to the hydraulic circuit that is already filled with the oil, and the lock-up clutch 4b will be engaged during the precharge.

Figure 7:
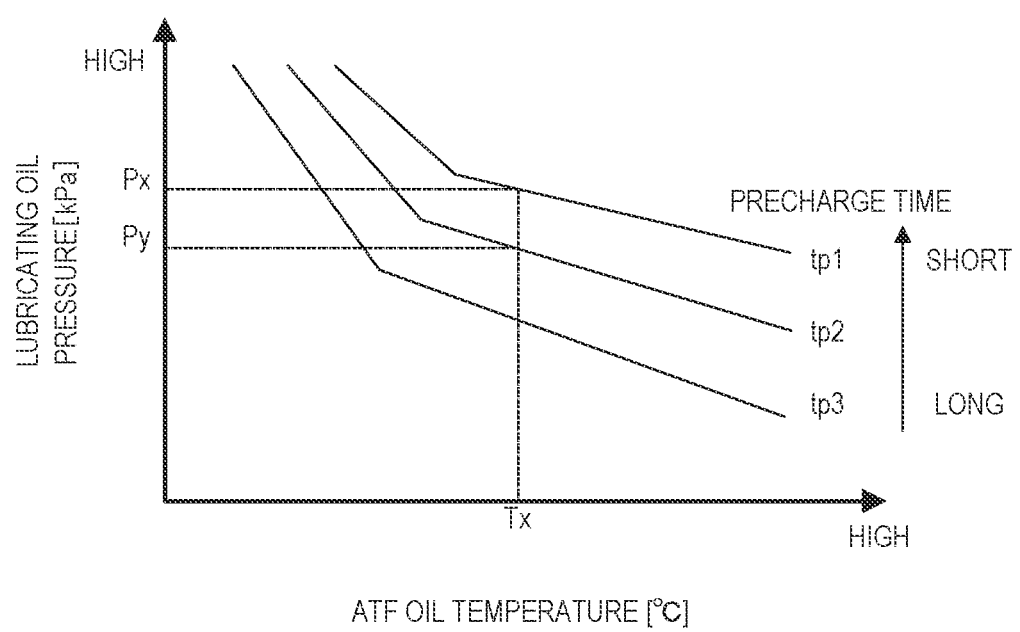
FIG. 7 is a map for calculating the precharge time of the lock-up clutch.

Therefore, in Step S15, the controller 7 calculates the precharge time T1 of the lock-up clutch 4b based on the lubricating oil pressure and the ATF oil temperature obtained in Step S14 and the map for calculating the precharge time of the lock-up clutch 4b shown in FIG. 7. The map is stored in the storage device of the controller 7.

The setting of the precharge time T1 will be described using FIG. 7 with examples. The map shown in FIG. 7 stores the precharge time for the lock-up clutch 4b that should be set at a specific lubricating oil pressure and a specific ATF oil temperature. That is, if the lubricating oil pressure and the ATF oil temperature are known, the precharge time for the lock-up clutch 4b to be set can be obtained. The precharge time increases in the order of the first time period tp1, the second time period tp2, and the third time period tp3. The first time period tp1, the second time period tp2, and the third time period tp3 are set to be, for example, from 0.1 seconds to about 0.2 seconds. Further, the precharge time shown in FIG. 7 is an example for explaining this embodiment, and the precharge time to be set is not limited to the range shown in FIG. 7. For example, the precharge time may be set in finer increments, or the lubricating oil pressure and the ATF oil temperature may be divided into a plurality of temperature regions to set the precharge time for each region.

As shown in FIG. 7, for example, when the ATF oil temperature obtained by the controller 7 is Tx [° C.] and the lubricating oil pressure is Px [kPa] (the first lubricating oil pressure), the precharge time T1 is set to the first time period tp1. In this case, if the precharge is performed during the first time period tp1, the precharge can be performed without unintentionally engaging the lock-up clutch 4b.

Further, for example, when the ATF oil temperature is Tx [° C.] and the lubricating oil pressure of the transmission mechanism 4 is Py [kPa] (the second lubricating oil pressure) which is lower than Px [kPa], the precharge time T1 is set to the second time period tp2 which is longer than the first time period tp1. In this case, if the precharge is performed during the second time period tp2, the precharge can be performed without unintentionally engaging the lock-up clutch 4b.

Thus, the controller 7 controls the lock-up oil pressure control valve 3b so that the precharge time when the lubricating oil pressure is the first lubricating oil pressure Px becomes the first time period tp1 that is shorter than the second time period tp2, which is the precharge time when the lubricating oil pressure is the second lubricating oil pressure Py which is lower than the first lubricating oil pressure Px. In other words, the controller 7 sets the precharge time for the lock-up clutch 4b to be shorter as the lubricating oil pressure increases. In this embodiment, the lubricating oil pressure increases as the outside air temperature decreases, and thus, the precharge time is set to be shorter as the outside air temperature decreases.

Setting the precharge time based on the lubricating oil pressure means setting the precharge time based on the oil filling state of the hydraulic circuit leading to the lock-up clutch 4b, which changes due to the lubricating oil pressure. That is, the transmission 100 performs a precharge during a set time according to the oil filling state of the hydraulic circuit leading to the lock-up clutch 4b, and thus, it is possible to prevent the lock-up clutch 4b from being unintentionally engaged during the precharge.

Further, as shown in FIG. 7, the controller 7 sets the precharge time based on the ATF oil temperature. That is, considering the viscosity of the oil, which decreases as the oil temperature increases, the precharge time T1 is set to be shorter as the ATF oil temperature increases. Once the controller 7 sets the precharge time T1, the controller 7 advances the process to Step S16.

In Step S16, the controller 7 controls the lock-up oil pressure control valve 3b to start a precharge and performs the count of the timer T. The timer T counts the elapsed time of the precharge. Then, the process is advanced to Step S17.

In Step S17, it is determined whether the timer T is equal to or greater than the precharge time T1. That is, it is determined whether the precharge time T1 set in Step S15 has elapsed. If the timer T is less than the precharge time T1, the process is advanced to Step S18. If the timer T is equal to or greater than the precharge time T1, the process is advanced to Step S19.

In Step S18, the controller 7 updates the precharge time T1 as follows.

First, the controller 7 obtains the lubricating oil pressure and the ATF oil temperature in the same way as in Step S14 and Step S15, and applies the lubricating oil pressure and the ATF oil temperature to the map of FIG. 7 to set the precharge time T2 corresponding to the state of the transmission 100 at the time of Step S18. Next, the controller 7 compares the precharge time T2 with the precharge time T1 set in Step S15, and if the precharge time T2 is shorter than the precharge time T1, the controller 7 updates the precharge time T1 with the precharge time T2 and advances the process to Step S17. On the other hand, if the precharge time T2 is equal to or greater than the precharge time T1, the precharge time T1 set in Step S15 is maintained (the precharge time T1 is not updated), and the process is advanced to Step S17.

The reason for performing the aforementioned Step S18 is as follows. The lubricating oil pressure set by the lubricating oil pressure control described above is updated according to the changes in the outside air temperature, oil pan oil temperature To, turbine rotation speed Nt, and turbine torque Tt. When the lubricating oil pressure is updated, the internal pressure of the torque converter 4a also changes accordingly, and thus, the appropriate precharge time of the lock-up clutch 4b also changes. If the precharge time corresponding to the changed lubricating oil pressure is shorter than the precharge time set in Step S15, when the precharge is continued according to the precharge time set in Step S15, excessive oil will be supplied to the lock-up clutch 4b, and the lock-up clutch 4b may be engaged. Therefore, in Step S18, the precharge time T2 at the time of Step S18 is compared with the precharge time T1 set in Step S15, and if the precharge time corresponding to the lubricating oil pressure is shorter, the precharge time is updated. Thereby, it is possible to prevent the lock-up clutch 4b from being unintentionally engaged during the precharge.

In Step S19, the controller 7 controls the lock-up oil pressure control valve 3b to terminate the precharge. Thereby, the precharge is performed by setting a precharge time based on the oil filling state of the hydraulic circuit leading to the lock-up clutch 4b that changes due to the lubricating oil pressure, and thus, it is possible to prevent the lock-up clutch 4b from being unintentionally engaged during the precharge. That is, the precharge control of the lock-up clutch 4b can be performed accurately.

The controller 7 advances the process to Step S20 after terminating the precharge. In Step S20, the controller 7 determines whether the lock-up condition is satisfied. The case where it is determined that the lock-up condition is satisfied is, for example, the case where the vehicle speed reaches a predetermined vehicle speed (for example, 10 km/h). If it is determined that the lock-up condition is satisfied, the process is advanced to Step S21 and the lock-up clutch 4b is engaged. The engagement control of the lock-up clutch 4b after terminating the precharge is performed by lowering the engagement oil pressure to a predetermined oil pressure at the end of the precharge and then increasing the oil pressure at a given ramp (increase rate) until the lock-up clutch 4b has a desired torque transfer capacity. If it is determined that the lock-up condition is not satisfied, the process is advanced to Step S20 and whether the lock-up condition is satisfied will be determined again.

Subsequently, the actions and effects of the embodiments described so far will be described.

(1) According to this embodiment, the transmission 100 includes: the transmission mechanism 4 including the torque converter 4a having the lock-up clutch 4b; the oil pump 2 that discharges the oil to be supplied to the transmission mechanism 4; the lock-up oil pressure control valve 3b that adjusts the pressure of the oil discharged from the oil pump 2 and supplies the oil to the lock-up clutch 4b; the lubricating oil pressure control valve 3a that adjusts the pressure of the oil discharged from the oil pump 2 and supplies the oil to the portion to be lubricated of the transmission mechanism 4; and the controller 7 that controls the lock-up oil pressure control valve 3b. Further, the controller 7 controls the lock-up oil pressure control valve 3b so that the precharge time when the lubricating oil pressure is the first lubricating oil pressure Px (the aforementioned lubricating oil pressure is the oil pressure supplied from the lubricating oil pressure control valve 3a) becomes shorter than the precharge time when the lubricating oil pressure is the second lubricating oil pressure Py which is lower than the first lubricating oil pressure Px when performing the precharge of supplying the oil to the lock-up clutch 4b so that the lock-up clutch 4b is in the state immediately before the lock-up.

According to this configuration, the precharge time is set based on the oil filling state of the hydraulic circuit leading to the lock-up clutch 4b that changes due to the lubricating oil pressure, and thus, it is possible to prevent unintentional engagement of the lock-up clutch 4b during control of engagement of the lock-up clutch 4b, not only during the precharge. That is, the lock-up clutch 4b can be controlled accurately.

(2) In addition, the controller 7 updates the precharge time T1 if the lubricating oil pressure changes before the precharge time T1 elapses.

(3) Further, when the controller 7 updates the precharge time T1, if the precharge time T2 corresponding to the changed lubricating oil pressure is shorter than the precharge time T1 corresponding to the lubricating oil pressure prior to the change, the controller 7 updates the precharge time T1 with the precharge time T2 corresponding to the changed lubricating oil pressure.

According to these configurations, the precharge time is updated appropriately in response to the update of the lubricating oil pressure, and thus, it is possible to further prevent unintended engagement of the lock-up clutch 4b.

(4) Further, the controller 7 prohibits the engagement (lock-up) of the lock-up clutch 4b when the lubricating oil pressure of the transmission mechanism 4 is equal to or greater than a specific lubricating oil pressure.

According to this configuration, in a situation where it is difficult to correctly perform the pressure difference control for engaging the lock-up clutch 4b, the engagement of the lock-up clutch 4b is not permitted, and thus, it is possible to prevent unintended engagement of the lock-up clutch 4b.

(5) Further, even when the lubricating oil pressure of the transmission mechanism 4 is equal to or greater than a specific lubricating oil pressure, if the ATF oil temperature exceeds a specific high oil temperature (for example, 110° C.), the controller 7 permits the engagement of the lock-up clutch 4b.

According to this configuration, the ATF oil temperature, which is high, can be decreased by prohibiting the release of the lock-up clutch 4b which is the cause of the increase in the ATF oil temperature and permitting the engagement of the lock-up clutch 4b, and thus, it is possible to appropriately protect a member having low heat resistance.

While the embodiments of the present invention have been described above, the above description of the embodiments is merely one example of application of the invention, and is not intended to limit the technical scope of the invention to the specific configuration of the above embodiments.

The present application claims a priority of Japanese Patent Application No. 2019-221652 filed with the Japan Patent Office on Dec. 6, 2019, all the contents of which are hereby incorporated by reference.

The invention claimed is:

1. A transmission, comprising:
a transmission mechanism including a torque converter having a lock-up clutch;
an oil pump configured to discharge an oil to be supplied to the transmission mechanism;
a lock-up oil pressure control valve configured to adjust a pressure of the oil discharged from the oil pump and supply the oil to the lock-up clutch;
a lubricating oil pressure control valve configured to adjust the pressure of the oil discharged from the oil pump and supply the oil to a portion to be lubricated of the transmission mechanism; and
a controller configured to control the lock-up oil pressure control valve and the lubricating oil pressure control valve,
wherein the controller controls the lubricating oil pressure control valve in a manner that a lubricating oil pressure which is the oil pressure supplied from the lubricating oil pressure control valve increases as an oil temperature decreases, and
controls the lock-up oil pressure control valve so that a precharge time when the lubricating oil pressure is a first lubricating oil pressure becomes shorter than another precharge time when the lubricating oil pressure is a second lubricating oil pressure which is lower than the first lubricating oil pressure when performing a precharge of supplying the oil to the lock-up clutch.

2. The transmission according to claim 1, wherein the controller updates the precharge time if the lubricating oil pressure changes before the precharge time elapses.

3. The transmission according to claim 2, wherein when the controller updates the precharge time, if the precharge time corresponding to the changed lubricating oil pressure is shorter than the prior precharge time corresponding to the lubricating oil pressure prior to the change, the controller updates the precharge time with the precharge time corresponding to the changed lubricating oil pressure.

4. The transmission according to claim 1, wherein the controller prohibits lock-up of the lock-up clutch when the lubricating oil pressure of the transmission mechanism is equal to or greater than a specific lubricating oil pressure.

5. The transmission according to claim 4, wherein even when the lubricating oil pressure of the transmission mechanism is equal to or greater than the specific lubricating oil pressure, if the oil temperature exceeds a specific high oil temperature, the controller permits lock-up of the lock-up clutch.

6. A control method for a transmission including:
a transmission mechanism including a torque converter having a lock-up clutch;
an oil pump that discharges an oil to be supplied to the transmission mechanism;
a lock-up oil pressure control valve that adjusts a pressure of the oil discharged from the oil pump and supplies the oil to the lock-up clutch; and
a lubricating oil pressure control valve that adjusts the pressure of the oil discharged from the oil pump and supplies the oil to a portion to be lubricated of the transmission mechanism, the method comprising:
controlling the lubricating oil pressure control valve in a manner that a lubricating oil pressure which is the oil pressure supplied from the lubricating oil pressure control valve increases as an oil temperature decreases,
controlling the lock-up oil pressure control valve so that a precharge time when the lubricating oil pressure is a first lubricating oil pressure becomes shorter than another precharge time when the lubricating oil pressure is a second lubricating oil pressure which is lower than the first lubricating oil pressure when performing a precharge of supplying the oil to the lock-up clutch.

* * * * *